United States Patent [19]

Danecker

[11] Patent Number: 5,028,065

[45] Date of Patent: Jul. 2, 1991

[54] WHEELCHAIR

[76] Inventor: Benno Danecker, Grafing 11, 8201 Halfing, Fed. Rep. of Germany

[21] Appl. No.: 358,334

[22] PCT Filed: Nov. 5, 1987

[86] PCT No.: PCT/EP87/00679

§ 371 Date: May 5, 1989

§ 102(e) Date: May 5, 1989

[87] PCT Pub. No.: WO88/03399

PCT Pub. Date: May 19, 1988

[30] Foreign Application Priority Data

Nov. 7, 1986 [DE] Fed. Rep. of Germany ....... 3638091

[51] Int. Cl.$^5$ ............................................ B62M 1/14

[52] U.S. Cl. ............................ 280/250.1; 280/304.1; 297/DIG. 1; 297/DIG. 4; 152/323

[58] Field of Search .................. 280/250.1, 304.1, 647, 280/649, 650, 657, 43.17; 180/907; 297/DIG. 1, DIG. 2, DIG. 4, 457; 264/46.9; 152/323; 301/63 PW

[56] References Cited

U.S. PATENT DOCUMENTS

| | | | |
|---|---|---|---|
| 3,139,306 | 6/1964 | Jennings | 297/DIG. 4 |
| 3,155,426 | 11/1964 | Rockwell | 297/DIG. 4 |
| 3,198,575 | 8/1965 | Hawkins | 297/DIG. 4 |
| 3,445,958 | 5/1969 | Johnson et al. | 152/323 |
| 3,452,798 | 7/1969 | Raureby | 152/323 |
| 3,632,162 | 1/1972 | Trethaway | 297/DIG. 4 |
| 3,874,727 | 4/1975 | Mehbert et al. | 297/457 |
| 3,952,822 | 4/1976 | Udden et al. | 297/DIG. 4 |
| 4,170,368 | 10/1979 | Southward et al. | 297/DIG. 4 |
| 4,300,249 | 11/1981 | Taylor | 297/460 |
| 4,588,542 | 5/1986 | Pierce | 264/46.9 |
| 4,593,929 | 6/1986 | Williams | 297/DIG. 4 |
| 4,728,119 | 3/1988 | Sigafoo | 297/DIG. 4 |
| 4,770,432 | 9/1988 | Wagner | 280/250.1 |

FOREIGN PATENT DOCUMENTS

| | | | |
|---|---|---|---|
| 0015741 | 3/1984 | European Pat. Off. . | |
| 0145278 | 6/1985 | European Pat. Off. . | |
| 0152716 | 8/1985 | European Pat. Off. . | |
| 0163139 | 12/1985 | European Pat. Off. . | |
| 1983139 | 4/1968 | Fed. Rep. of Germany . | |
| 2832026 | 1/1980 | Fed. Rep. of Germany . | |
| 2947327 | 6/1980 | Fed. Rep. of Germany . | |
| 3145568 | 5/1983 | Fed. Rep. of Germany . | |
| 3304793 | 8/1984 | Fed. Rep. of Germany . | |
| 8429555 | 1/1985 | Fed. Rep. of Germany . | |
| 3414204 | 10/1985 | Fed. Rep. of Germany . | |
| 3509408 | 12/1985 | Fed. Rep. of Germany . | |
| 8521183 | 12/1985 | Fed. Rep. of Germany . | |
| 3526985 | 6/1986 | Fed. Rep. of Germany . | |
| 2307697 | 11/1976 | France . | |
| 2441362 | 6/1980 | France . | |
| 2515031 | 4/1983 | France . | |
| 2526311 | 11/1983 | France . | |
| 0093602 | 6/1983 | Japan | 152/323 |
| 1216476 | 12/1970 | United Kingdom . | |
| 8501205 | 3/1985 | World Int. Prop. O. . | |

OTHER PUBLICATIONS

Kagan, "A Functional Approach to Upholstered Furniture Design", 2/1/64.

DE-Firmenschrft: Fa. Meyra, Katlog Aug. 1984, S. 90-92.

*Primary Examiner*—Charles A. Marmor
*Assistant Examiner*—A. M. Boehler
*Attorney, Agent, or Firm*—Nixon & Vanderhye

[57] ABSTRACT

In order to produce a much simpler and in particular lighter-weight wheel-chair than existing models, and to achieve at the same time optimum rigidity and safety, the surface of the seat (3), back support (1) and side-walls (5) are designed as a self-supporting monocoque construction, in self-reinforced and/or foam plastic. The base (25) carried by the wheels (17,37) also consists of self-reinforcing and/or foam plastic. The monocoque construction and base are integrally formed and have a height adjustment feature.

17 Claims, 10 Drawing Sheets

Figure 1:
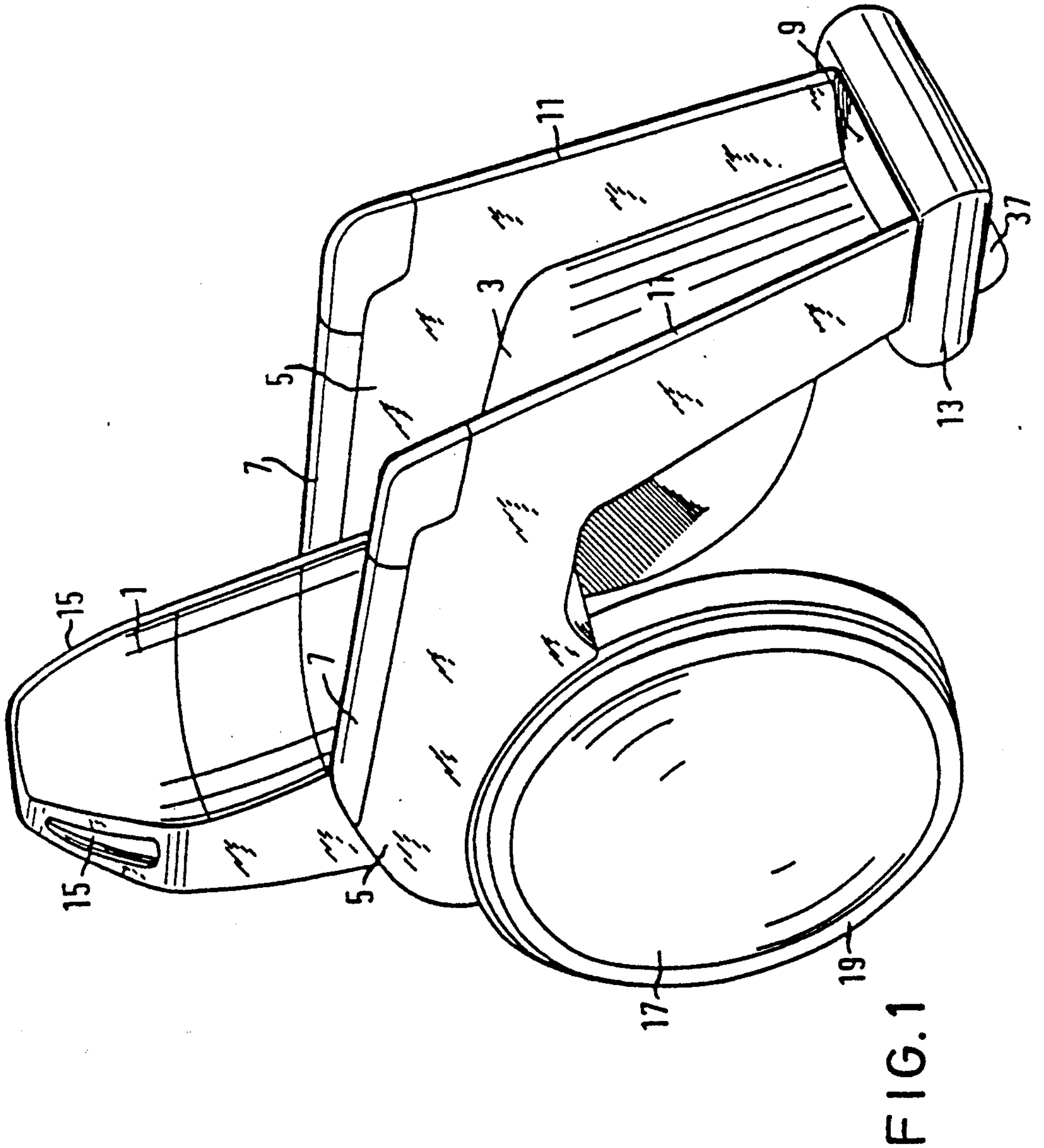

FIG. 5
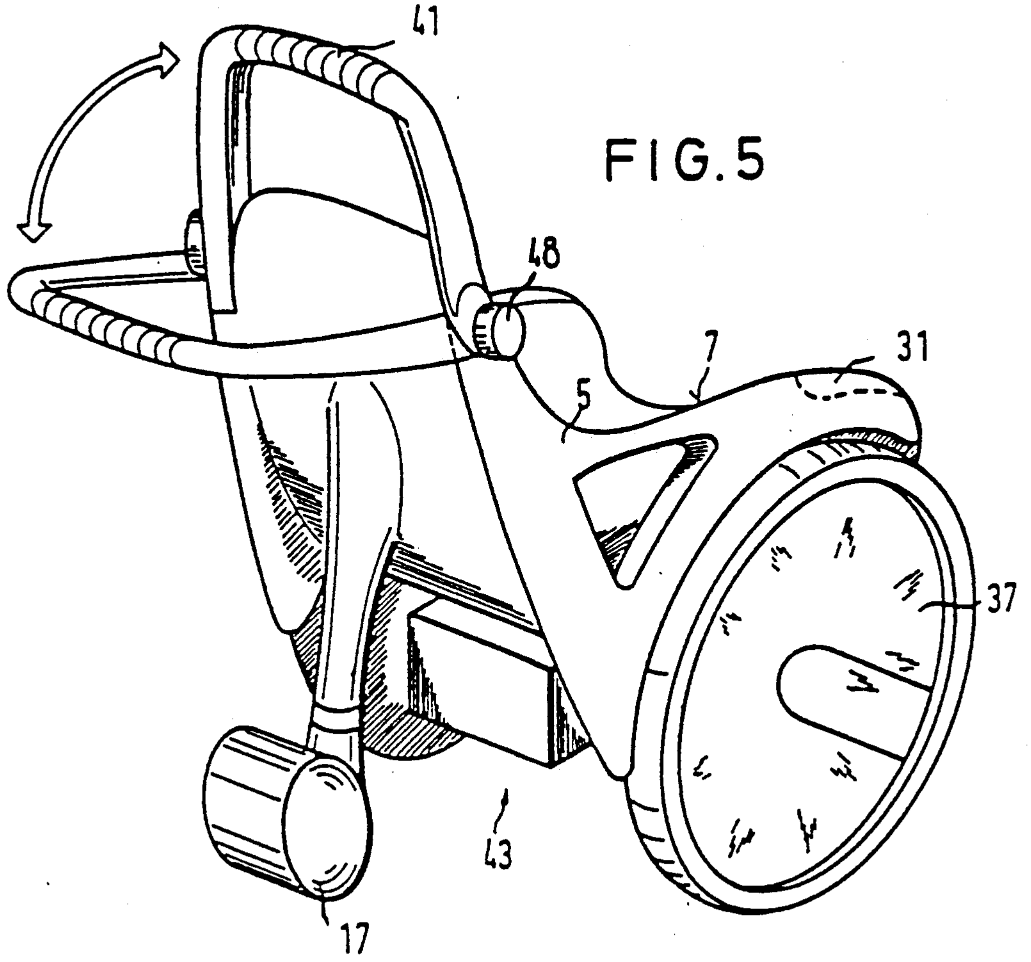
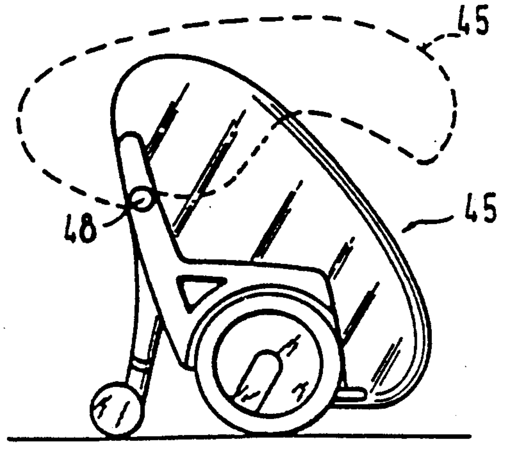
FIG. 7
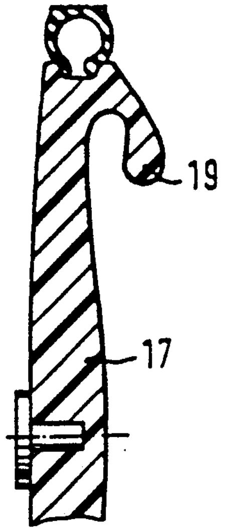
FIG. 6

WHEELCHAIR

The invention relates to a wheelchair according to the introductory clause of claim 1.

Wheelchairs are known, for example from DE-OS 29 46 391, DE-OS 32 39 472 and DE-GM 85 21 183. Common to all these wheelchairs is that they include as a rule a collapsible carrying frame or a collapsible substructure with tube carriers, levers and rods, on which the two larger rear wheels with hand rail, the front wheels and the seat structure are detachably mounted.

However, wheelchairs of this kind with a metal underframe are relatively heavy and on account of the great number of individual parts can be produced only at great cost.

Furthermore in DE-OS 35 26 985 a sport wheelchair has also already been proposed, which consists of a plastic frame with plastic rims and streamlined spokes as well as plastic sport grip rings. By use of said plastic parts this sport wheelchair is to exhibit a lesser weight in comparison with traditional wheelchairs. But otherwise the basic design of this wheelchair is comparable to traditional wheelchairs, since here too an ordinary underframe with rods is used.

The object of this invention is therefore to provide a wheelchair which, in comparison with traditional wheelchairs, is much more simply designed and therefore cheaper to produce, and which, with comparably light weight, exhibits an optimal rigidity and safety. At the same time the possibility is to exist to improve the sitting comfort also with simple means. According to need and requirements a folding mechanism is also to be possible for a wheelchair of this kind. Advantageous configurations of the invention are given in the subclaims.

By this invention, for the first time a completely different conceptual mode for a wheelchair is chosen.

The wheelchair according to the invention exhibits by its shell design an optimal rigidity which, particularly in one-piece frame design, guarantees a favorable force distribution. At the same time, by the use of plastic, a lightweight embodiment is then also possible, if the wheelchair as a whole is made in a relatively compact manner. Particularly with the use of hard foam material for the wheelchair possible dangers of injury can also be minimized by a homogeneous shape, because individual rods and levers necessary according to prior art are superfluous in this invention. By use of hard and soft foam sections and parts, safety can also be heightened and sitting comfort can be improved.

By use of the shell design in the production of the wheelchair there can be provided by means of a mold casting and without any problem, armrests that can be made in one piece with the frame design as a whole.

The backrest can at the same time be raised up to head level or also be made so that a head rest can be anchored on the upper part of the backrest.

By the armrests being able to be run as far as the pedal, there results improved safety from lateral jolts. In addition, at least on the pedal, yet one more integrated surrounding shock absorber can be designed.

The wheelchair can, as mentioned, consist of cellularly expanded plastic, so that soft-hard material combinations are also possible. The parts formed of soft foam materials thus also serve at the same time as upholstering.

This corrosion resistant material is moreover easy to care for and aseptic and thus offers advantages in use even in hospitals. In addition, the wheelchair as a whole is extremely quiet because of the high material damping values.

The advantages described result especially because of the wheel according to the invention, which is made as a complete plastic wheel. Since it is made as a solid wheel, the handrail can be included in an integrated manner. In addition the solid wheel can also be made of foamed plastic, so that it can also be produced cheaply and exhibits only an extremely light weight. The solid material as a flat tire is also suitable, and on the rolling surface opposite the remaining wheel body softer plastic foam can be used. Thus an optimal shock absorption also results with easy and quiet running. Also the handrail made in an integrated manner can be made of plastic foam that is softer compared with solid wheel material. Although from DE-OS 33 16 002 a hand grip on the wheel of a wheelchair has become known, which is also produced from cellularly expanded plastic, this handrail made in tube form must be fitted with traditional fastening elements, to be installed on an ordinary spoke wheel.

Furthermore the advantages according to the invention can also then be achieved just as well with a correspondingly firm and stable seat surface and backrest not collapsible into themselves, if a folding mechanism made according to the invention is provided.

Figure 2:
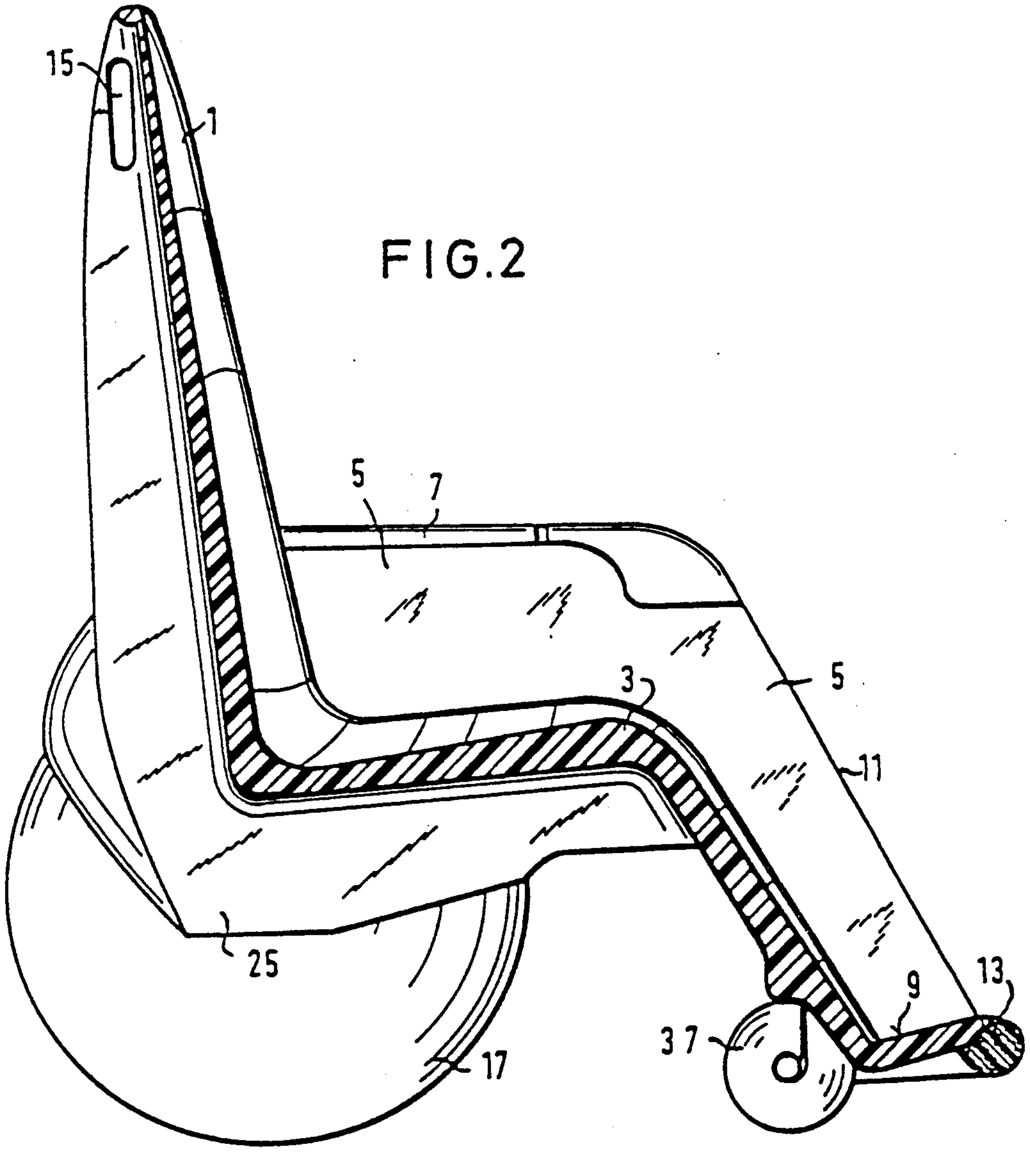
Figure 3:
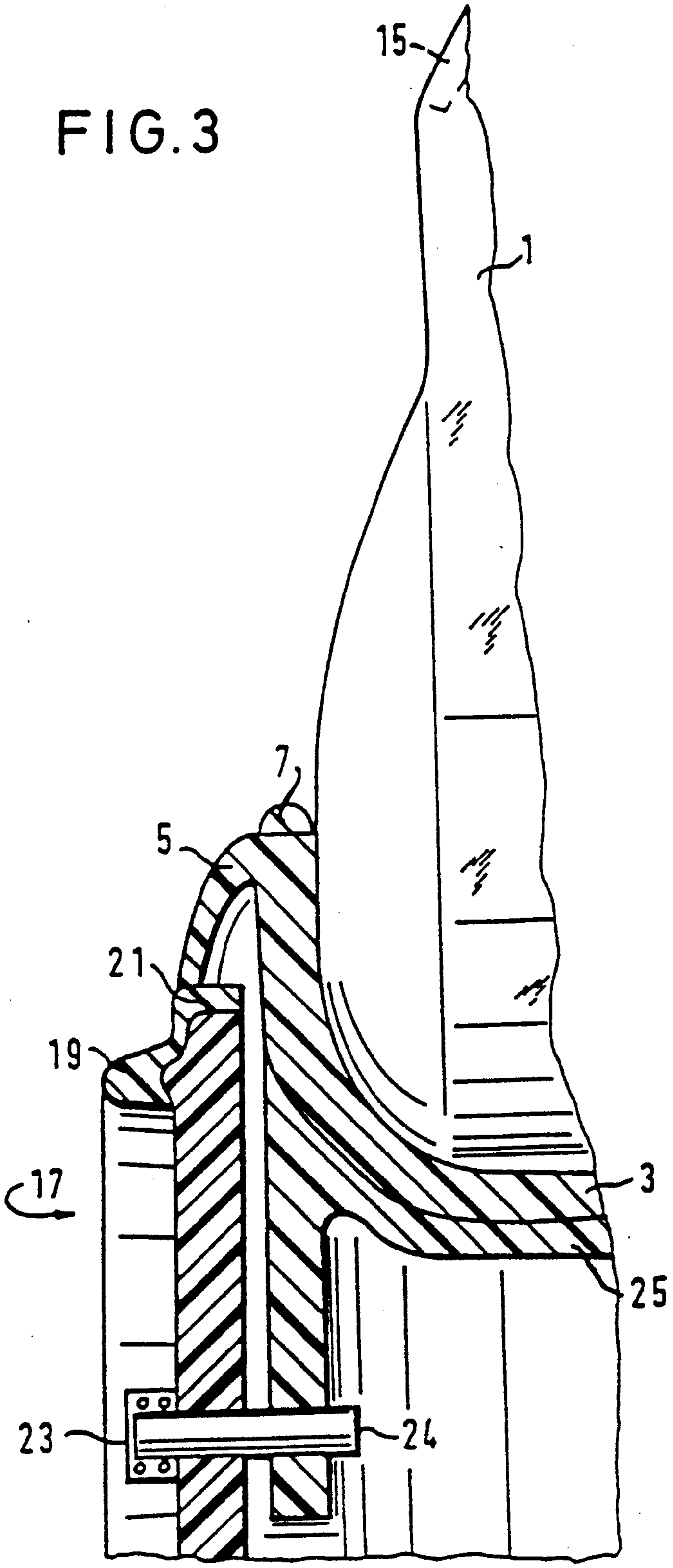
Figure 4:
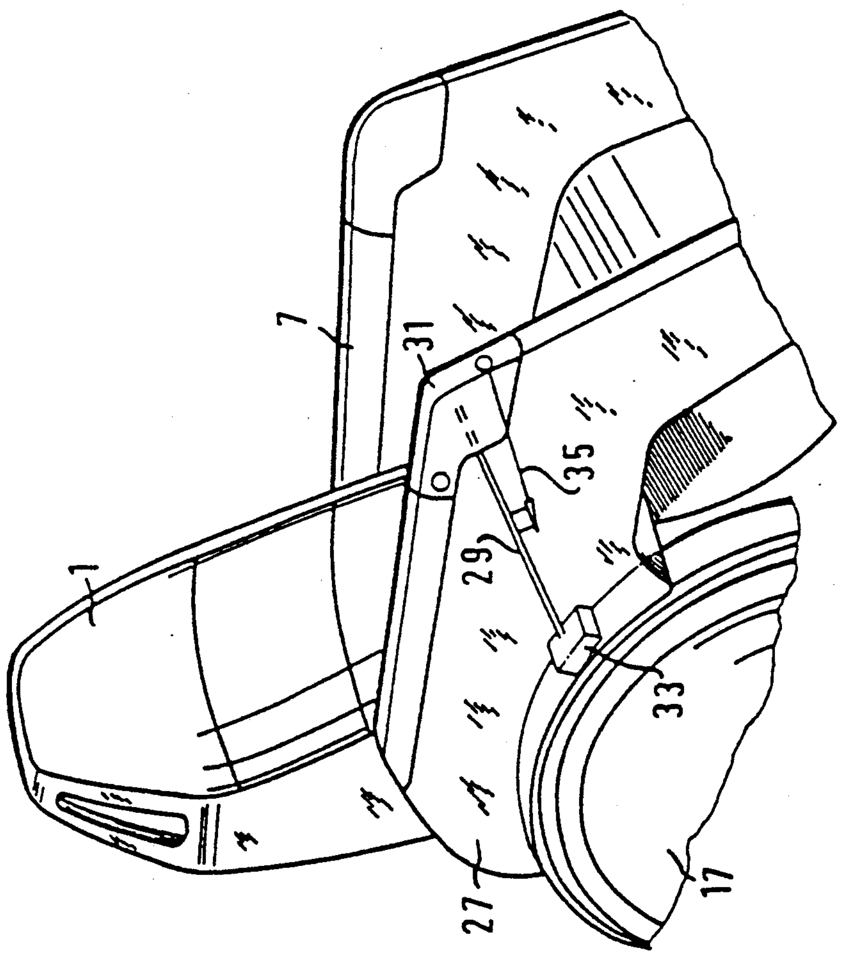
Figure 8:
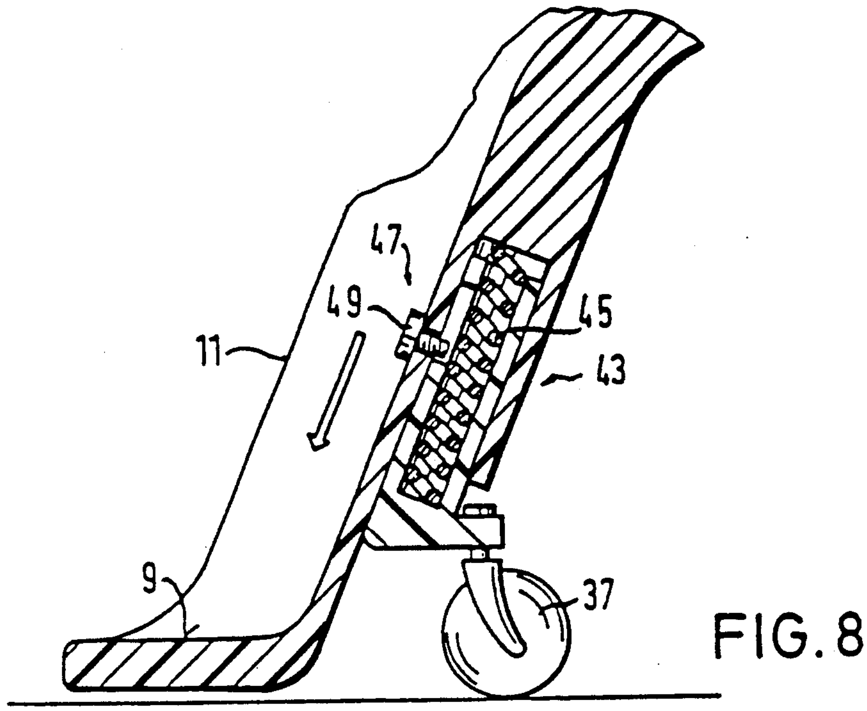
Figure 9:
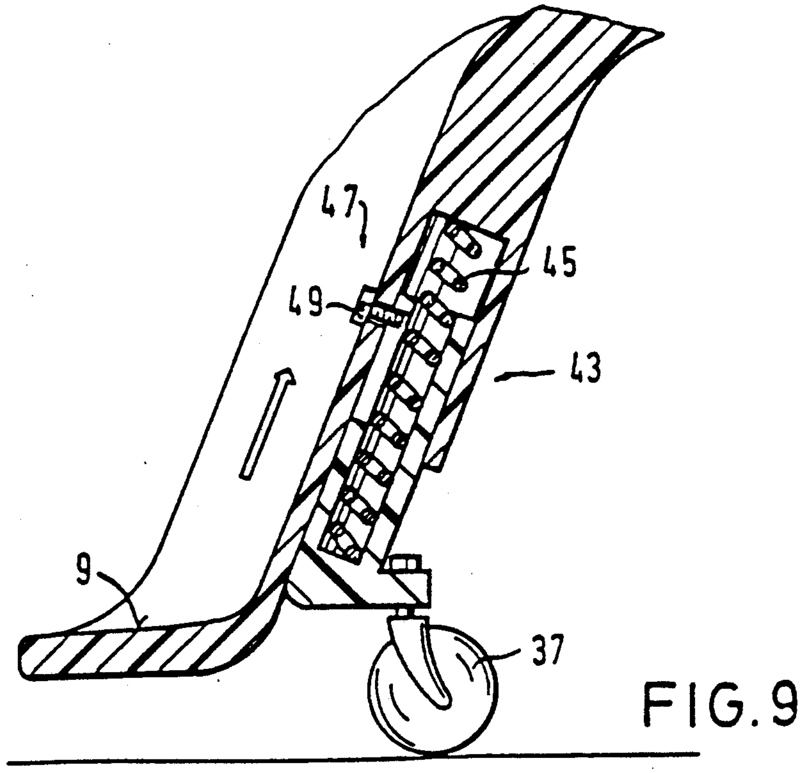
Figure 10:
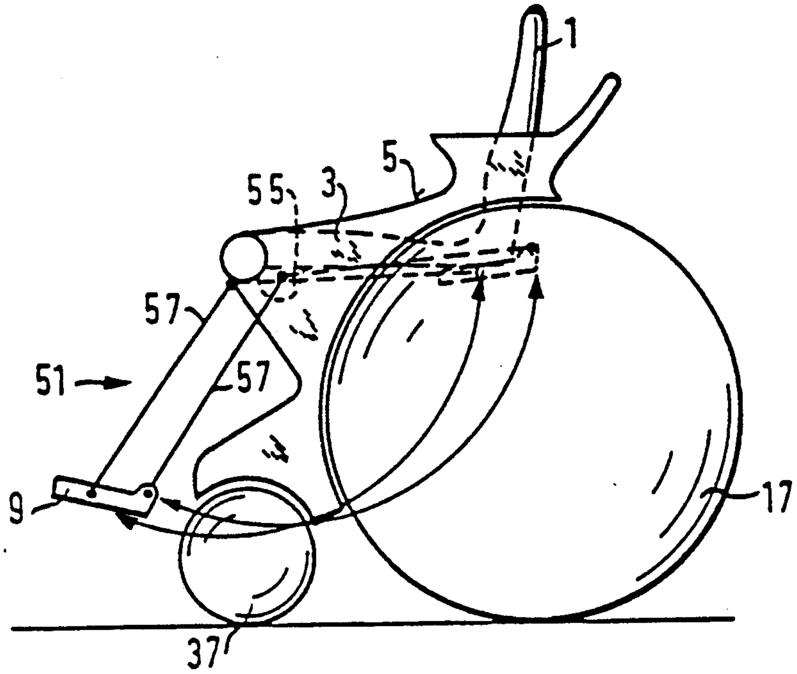
Figure 11:
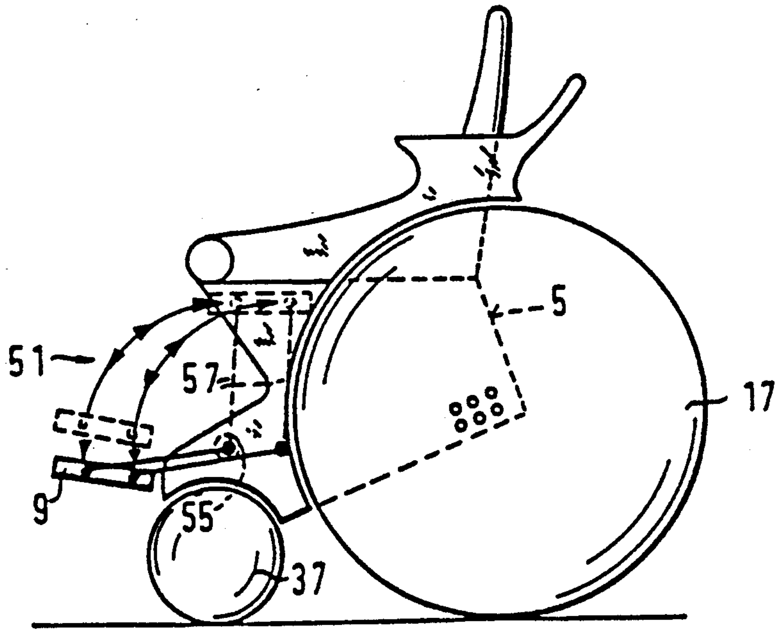
Figure 12:
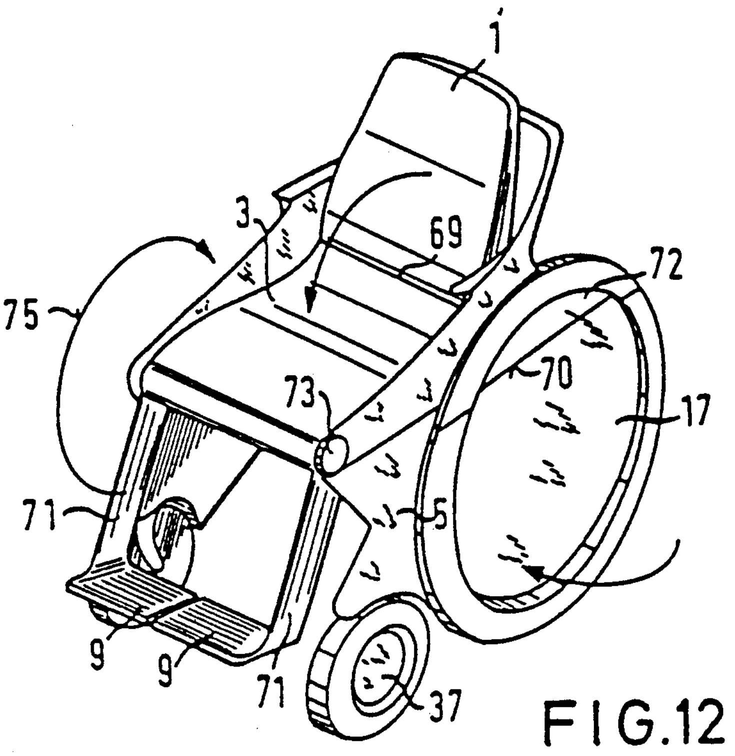
Figure 13:
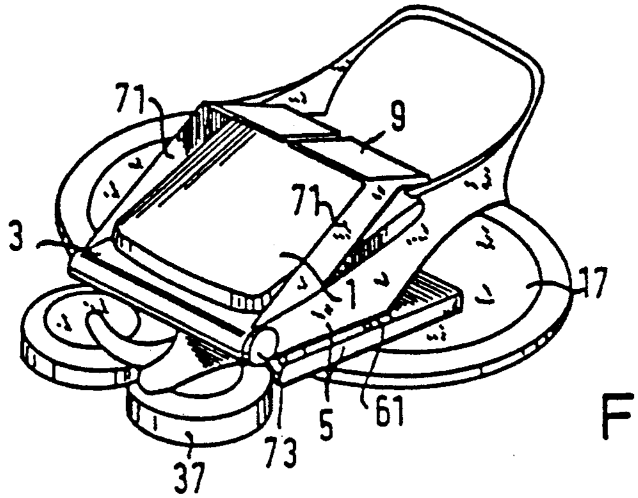
Figure 14:
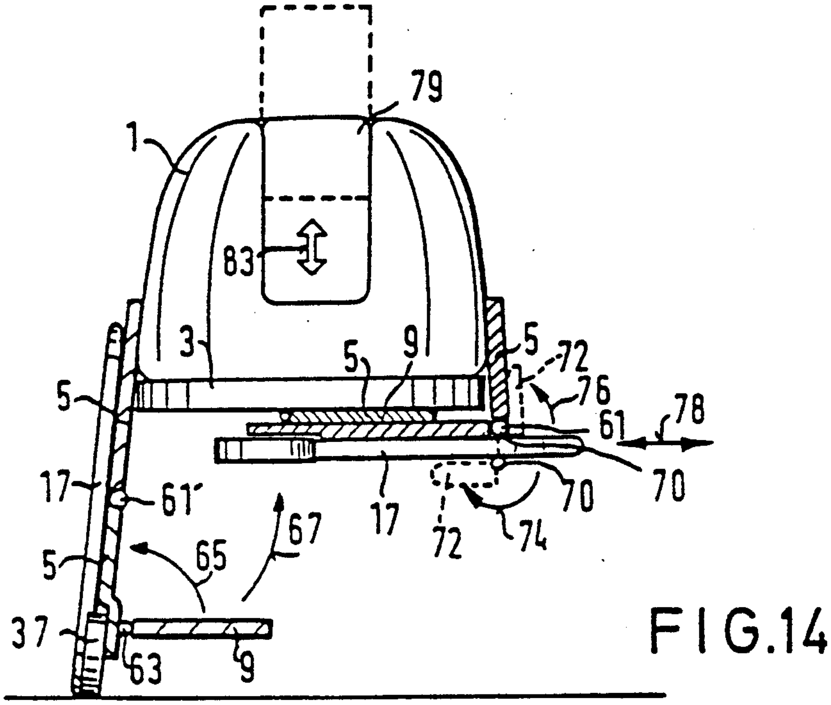
Figure 15:
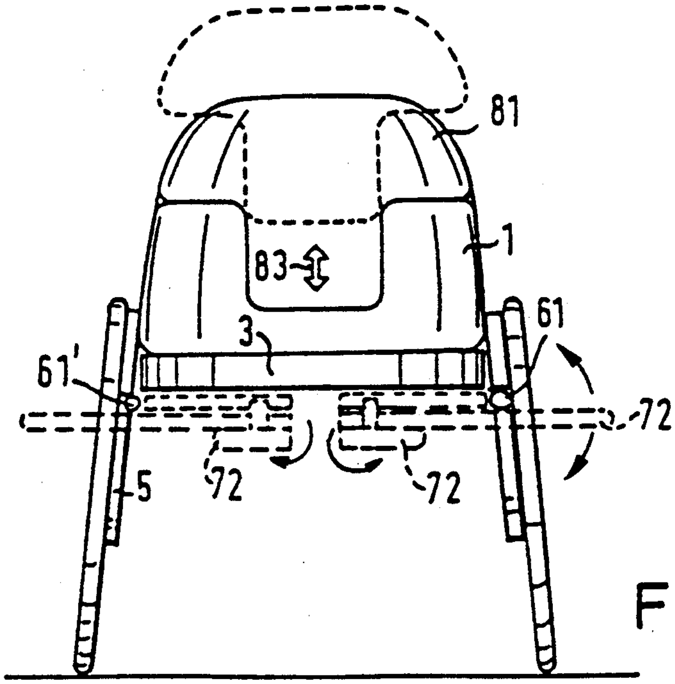
Figure 16A:
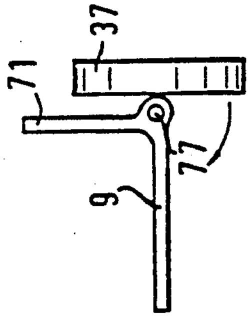
Figure 16B:
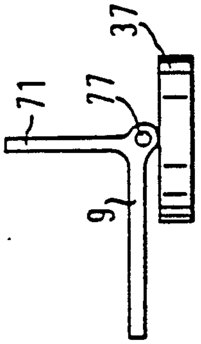
Figure 17:
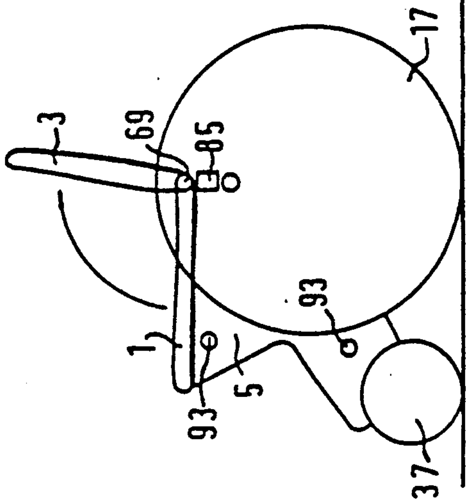
Figure 18:
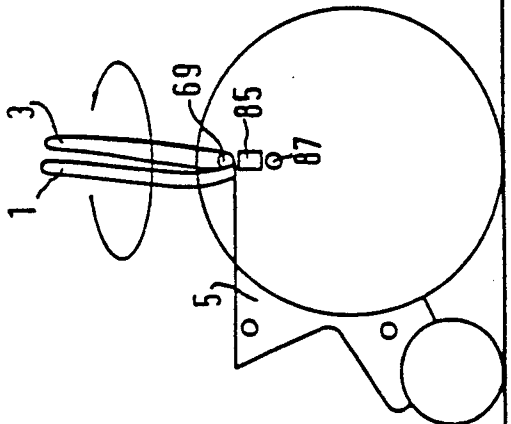
Figure 19:
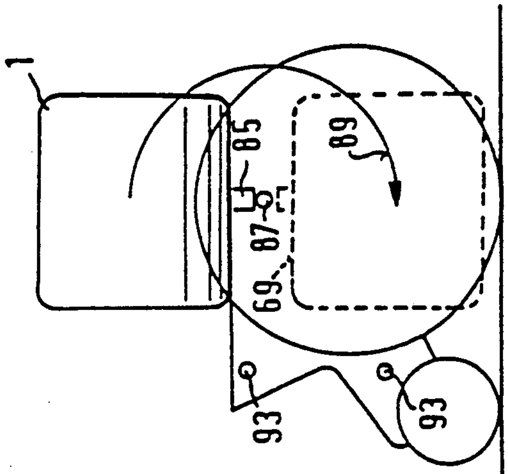

Further advantages, details and features of the invention follow below from the embodiments represented by way of drawings. Shown in detail are:

FIG. 1: a diagrammatic perspective representation of the wheelchair according to the invention;

FIG. 2: a diagrammatic longitudinal section representation;

FIG. 3: a diagrammatic cross section representation through a wheel and the adjoining part of the wheelchair;

FIG. 4: a diagrammatic representation of the braking system;

FIG. 5: a perspective view of another embodiment;

FIG. 6: a detailed section representation through the wheel;

FIG. 7: a side view of the embodiment according to FIG. 5;

FIGS. 8 and 9: two diagrammatic section representations of a lowering device for the footrest;

In the figures a wheelchair is shown which, in shell design with a one-piece frame, consists of a cellularly expanded plastic. This one-piece frame design includes with it backrest 1, seat surface 3, side frame parts 5, which on their upper side merge into armrests 7. Seat surface 3 and side frames 5 are run continuously from armrest 7 to footrest 9, giving enhanced side protection.

By use of foamed plastic, the wheelchair as a whole in its one-piece frame design is extremely compact and rigid and at the same time very light. If necessary, a self-reinforced design with additional ribs and reinforcing elements may be selected in or underneath the plastic body.

By suitable selection of the plastic, the desired rigidity and hardness can be achieved. By use of hard foam material, certain parts of the wheelchair as desired may also be fitted additionally with soft foam parts. For this, for example, backrest 1, seat surface 3, armrests 7 as well as top edge 11 of side frames 5 in the transition region from armrests 7 to footrest 9 may be considered.

Also yet another surrounding shock absorber 13 also made of soft foam material may be provided on the underside of the footrest.

Seen in cross section, the wheelchair is fitted in shell construction, and also the backrest in cross section is made U-shaped. On the upper side in the backrest pushing grips 15 are provided, which can also serve at the same time as insertion openings for a detachable extended head rest. However also, naturally, backrest 1 can be also pulled up higher, as represented in FIG. 1, to serve at the same time as a head rest.

The back space behind backrest 1 as well as the space underneath seat surface 3 can be used as stowage, in addition to which another floor provided underneath seat surface 3, but not shown in more detail in FIG. 1 can be provided or made to be attached.

As represented in FIG. 3, rear wheels 17 consist of a plastic solid body, which is preferably also produced from foamed plastic. Here hand rail 19 and tires 21 are part of the solid wheel. Use of the foamed plastic results not only in ease of movement but above all optimal shock absorption by appropriate choice of material. Here in the production of the wheel both hard and soft foam materials can also be used simultaneously. FIG. 3 represents, for example, at least hand rail 19 and tires 21 here made as tires can be made of soft foam material in contrast with the remaining wheel body.

Of course, at least the whole outer side can also consist of soft foam material, and the lateral safety function can be even further improved.

Here bearing 23 is cast integrally with the wheel during the production process or else surrounded with foam and by pivot 24 is put on a substructure 25 of the wheelchair and secured. Here substructure 25 is an integral component of the wheelchair as a whole, so that here also no further assembly work is necessary.

Deviating from the embodiment shown, handrail 19 can be located on the outer circumference of a disk body separated from the rest of the solid wheel, to activate a shifting hub provided on the axis of rotation of the wheel. A shifting hub of this kind can make possible, for example, a reduction to a lower gear, and moving the wheelchair is possible even for elderly and weak persons at slight gradients.

Subsequently reference is made to FIG. 4 in which integrated brake 27 is shown diagrammatically.

Brake 27 comprises an ordinary brake-rod linkage 29, and the manually operated brake works by activation of a brake lever 31, which is an integrated component of armrest 7. At the end of brake linkage 29 located opposite the arm lever, there is provided brake shoe 33, which acts on the rolling surface of wheel 17. Here not only a power braking action is possible but also a positively locking braking action if, for example, the rolling surface of wheel 17 and brake shoe 33 are each provided with projecting and interlocking nubs. By activating additional locking element 35 the manually operated brake can also be secured.

In conclusion it should be noted that underneath or behind footrest 9 at least one, preferably two, rotatable forward wheels 37 are provided, which are kept rotatable by pin 39 and are attached to follow.

A wheelchair corresponding to the embodiment explained above can have here a weight of merely a maximum of 12 to 16 kilograms with foamed plastics or 3 to 6 kilograms especially with fiber-reinforced plastics.

As can be seen from FIG. 3, substructure 25 can also be produced as a separate component and later be connected with the backseat part. As possible kinds of fastening, along with detachable fastenings, for example gluing, welding etc. are suitable.

In FIG. 5 another embodiment of a wheelchair according to the invention is shown diagrammatically, in which front wheels 37 represent the carrying wheels. Here also the armrest is made so that again the tire is covered or concealed in at least one upper region. Here also on wheel 17 hand rail 19 can be provided as an integral component. In this embodiment a traditional tire is used as a tread surface (FIG. 6).

Upper handlebar 41 is foldable and can therefore serve as headrest and handle. The rear third wheel is mounted to pivot and an electric motor at least as a supporting driving power can be incorporated. On the underside of the wheelchair battery 43 can additionally be attached. Here also in the armrest the activating elements for the brake can be housed in an integrated manner.

As shown in diagrammatic side view in FIG. 7, the wheelchair can also be provided with a transparent rain hood 45, which in the embodiment shown in side view is almost egg-shaped. Here the rain hood can be raised around an upper pin 48 in the area of the backrest. The rain hood is thus detachable.

As can be seen from the explanations of the embodiment, the wheelchair can be made of different plastics, for example thermoplastics, thermosets and/or elastomers. Precisely in the processing of different materials certain advantages can be achieved. Thus either thermoplastics, thermosets or elastomers can be also made as fiber reinforced, and particularly stable and light designs can be made possible. In particular also by use of foamed plastic, the latter can be applied as foam to other plastics largely without any problem. If necessary, coupling agents can also be used. In this way the desired sandwich design may be achieved. Precisely by use of foamed materials optionally necessary support and carrying skeletons can be surrounded with foam without any problem, for example, to achieve a desired rigidity even with the use of soft foam materials.

In FIGS. 8 and 9 lowering device 43 is explained, which is adjustable against the thrust of spring 45. By releasing stop device 47 spring 45 can be moved forward by weight displacement so that the wheelchair with its footrest 9 lowers down to the floor. In this position, stop device 47 can be locked, so that the footrest remains on the floor, even if nobody is sitting in the wheelchair. After someone sits down again on the wheelchair and after the stop device is released, the footrest is automatically raised again, and in raised position the stop device can be locked again in a corresponding hole for example by pressing activating button 49. The mechanism can be supported or driven electrically by a motor. Pressure element 45 acts here on front wheel 37 which is run steerably in a bushing, so that lowering device 43 also constitutes at the same time a height adjustment device for the front wheel. Also a gas pressure spring or other spring devices can be incorporated for spring 45.

I claim:

1. A wheelchair comprising:

a plastic carrying structure having a seat portion, a rearward backrest portion, a forward footrest portion, and two side board portions formed in a unitary shell design;

a plastic substructure supporting said unitary carrying structure wherein said carrying structure and said substructure are made as one piece;

solid foamed plastic wheel bodies rotatably connected to and supporting said substructure, each of said wheel bodies having an integrally formed solid foamed plastic rolling surface, wherein at least one pair of said wheel bodies is disposed on opposite sides of said substructure, each of said pair of wheel bodies having an integrally formed solid foamed plastic handrail; and a height adjustment means for lowering and raising said footrest portion of said carrying structure while maintaining a preset distance between said footrest portion and said seat portion.

2. Wheelchair according to claim 1, wherein said side board portions have armrests (7), which are made of foamed plastic.

3. Wheelchair according to claim 2 further comprising a wheel body brake assembly pivotally connected to one of said armrests.

4. Wheelchair according to claim 1, wherein said side board portions extend to said footrest portion.

5. Wheelchair according to claim 1, further comprising a foamed plastic integrated shock absorber (13) connected to said footrest portion.

6. Wheelchair according to claim 1, wherein the wheelchair comprises hard foam plastic and at least an upper side of said armrests (7), said seat portion said backrest portion are made, in contrast, of more elastic soft foam plastic.

7. Wheelchair according to claim 1, wherein the rolling surface of said wheel bodies, in one upper partial circumference area, are covered by said side board portions.

8. Wheelchair according to claim 1, wherein said rolling surface of each of said wheel bodies is made of soft foam plastic.

9. Wheelchair according to claim 1, wherein said handrail of each of said at least one pair of said wheel bodies is made of soft foam plastic.

10. Wheelchair according to claim 1, wherein a pivot bearing is centered axially and enclosed in said wheel bodies during form casting.

11. Wheelchair according to claim 1, wherein it is provided with a removable or foldable rain hood made of transparent plastic.

12. Wheelchair according to claim 11, wherein the rain hood can be swung around a horizontal pin, preferably in the area of the backrest.

13. A wheelchair according to claim 1, wherein said handrail and said rolling surface of said at least one pair of said wheel bodies are made of soft foam plastic compared to the plastic of said wheel bodies.

14. A wheelchair according to claim 1, wherein said height adjustment means comprises a spring.

15. A wheelchair, comprising a unitary chair body formed of selected plastics material sufficient to support a person, said chair body including a backrest portion, a seat portion, and a footrest portion integrally connected to one another in that order, said footrest portion being rigidly fixed at a position below said seat portion to thereby establish a fixed dimension therebetween;

wheel means coupled to said chair body to support said chair body for rolling movements over a surface wherein said wheel means includes a pair of plastic wheel bodies rotatably coupled to said chair body and having axles that are mounted in fixed relation to the chair body on opposite sides thereof, the wheel bodies adapted to being manually rotated by a person occupying the chair body to rollingly propel the chair body across the surface;

height adjustment means operatively associated with said chair body to allow said chair body to be adjustably raised and lowered so that said footrest portion respectively moves between higher and lower positions relative to the surface while maintaining said fixed dimension between said footrest portion and said seat portion, wherein said footrest portion is closely adjacent to the surface when in said lower position thereof as compared to said higher position.

16. A wheelchair according to claim 15, wherein, said pair of wheel bodies including integrally formed annular hand rail and rolling surface portions.

17. A wheelchair according to claim 16, wherein said handrail and rolling surface portions are foamed plastic.

* * * * *